April 16, 1957 L. P. M. TEN DAM 2,789,252
AUXILIARY APPARATUS FOR ENERGIZING AN ELECTRIC DISCHARGE TUBE
Filed Feb. 15, 1952

United States Patent Office 2,789,252
Patented Apr. 16, 1957

2,789,252

AUXILIARY APPARATUS FOR ENERGIZING AN ELECTRIC DISCHARGE TUBE

Lambertus Petrus Maria Ten Dam, Eindhoven, Netherlands, assignor, by mesne assignments, to North American Philips Company, Inc., New York, N. Y., a corporation of Delaware Application February 15, 1952, Serial No. 271,707

Claims priority, application Netherlands March 9, 1951

4 Claims. (Cl. 315—138)

This invention relates to auxiliary apparatus for energizing an electric discharge tube of the gas or vapor discharge type. More particularly, the invention relates to a transformer for energizing a tube of the foregoing type through a capacitor.

Auxiliary apparatus for energizing gas or vapor electric discharge tubes generally comprises an inductor and a capacitor arranged so that the combination of the tube, inductor and capacitor presents a capacitative load to a current supply.

Tubes of the foregoing type generally require an igniting voltage which is higher than their operating voltage and are therefore generally energized through a step-up transformer for starting purposes. This may occur, for example, when the tube itself or the tube together with an igniting switch or another auxiliary means for igniting requires an igniting voltage of from 200 to 250 volts and the supply voltage is only 100 to 130 volts. For such purposes, it is desirable to connect the transformer and the inductor in series with the tube, which may be effected by constructing the transformer as a leakage or stray field transformer, i. e., a transformer having a portion of its ferromagnetic core shunted by a permeable magnetic member. This entails difficulties, however, since it has been found that the induced voltage in the winding on that portion of the ferromagnetic core shunted by the magnetic member in the load condition is about three times the induced voltage in the same winding in the no-load condition. Consequently, if this shunted winding is proportioned for the no-load condition, an excessive induced voltage occurs thereacross in the load condition resulting in a strong humming noise and current distortion. If, on the other hand, this shunted winding is proportioned for the load condition, the winding on the ferromagnetic core not shunted by the magnetic member will be underloaded, hence, resulting in excessive use of conductor material.

It is an object of the invention to obviate the above difficulties by providing a leakage transformer for energizing a gas or vapor electric discharge tube through a capacitor wherein the difference between the voltages induced in any of the windings of the transformer in the no-load condition and the load condition is reduced, or, preferably, is made equal to one another.

This and further objects of the invention will appear from the description that follows.

According to the invention, a leakage transformer for an electric discharge tube of the gaseous or vapor type comprises a ferromagnetic core and a magnetic member shunting a portion of such core. The unshunted portion of such core is provided with a primary and a secondary winding having a turns ratio at which the voltage induced in the secondary winding by a current of given voltage in the primary winding is greater than that required for igniting a given gas-filled electric discharge tube. The shunted portion of the core is provided with a tertiary winding connected to the secondary winding in a manner such that the voltage induced in the tertiary winding opposes the voltage induced in the secondary winding; the tertiary winding being so proportioned relative to the secondary winding that the voltage induced across both windings is, in the no-load condition, equal to that required for igniting the given tube. Moreover, the windings may be further proportioned relative to each other so that the voltage induced in any one winding remains substantially constant for both the no-load and load conditions.

A leakage transformer for energizing a gas-filled electrical discharge tube through a capacitor drawing a leading current and for energizing an additional discharge tube drawing a lagging current may also be provided, when desired, in accordance with the invention. In such a case, the transformer described above is provided with a second magnetic member shunting another portion of the ferro-magnetic core. This second shunted portion is provided with a quaternary winding connected to the aforesaid primary winding and having a turns ratio such that the voltage produced across both windings is equal to that required for igniting the additional tube. Moreover, all of the windings may be proportioned relative to each other so that the induced voltage in each of the windings in the no-load condition is substantially the same as the induced voltage in each of the windings in the load condition. With such an arrangement, there may be obtained a power factor having a value very close to unity resulting in a strong reduction of the stroboscopic effect of the total radiation produced by both tubes.

The invention will now be described with reference to the accompanying drawing wherein.

Figure 1:
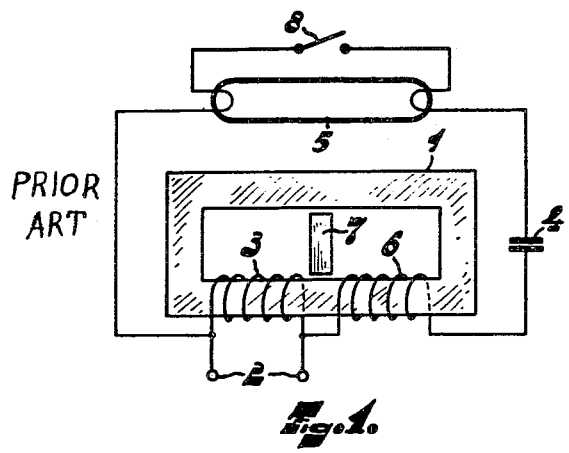
Fig. 1 is a schematic view of the circuit of a conventional leakage autotransformer energizing a gas or vapor discharge tube through a capacitor.
Figure 2:
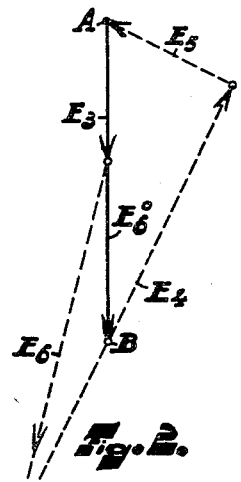
Fig. 2 is the no-load vector diagram of the circuit of Fig. 1; the dotted lines showing the vector diagram of the circuit under load condition.

In order that the invention may be more clearly understood, reference is had to Figs. 1 and 2 which show a conventional transformer for energizing a discharge tube and the vector diagram of the voltages induced in the various parts of the circuit, respectively.

Referring to Fig. 1, 1 designates the ferromagnetic circuit of a conventional auto leakage transformer, comprising a primary winding 3, to be connected to a current supply 2, a leakage winding 6, connected in series with the former, a capacitor 4 and a discharge tube 5. A magnetic shunt member 7 is provided between the two windings 3 and 6. An ignition switch 8 may be connected in parallel with the tube 5 and in series with the thermionic electrodes of the latter and, if desired, also in series with an auxiliary inductor (not shown).

If it is assumed that the tube ignites at a voltage of 220 v., the transformer must furnish this voltage in the unloaded condition, it being further assumed that the current supply furnishes a voltage of 110 v.

This condition, no-load condition, in which the tube is not ignited and the switch 8, if provided, is not closed, is indicated in the voltage vector diagram of Fig. 2 in full lines; $E_3$ designates the voltage vector of the winding 3 and $E_6^0$ the vector of the voltage across the winding 6 in line with $E_3$. In this condition no current passes through the load circuit, so that there is no voltage across the capacitor 4, the tube 5 having the no-load voltage, i. e. the vector sum of $E_3$ and $E_6^0$, consequently the distance between points A and B.

As soon as the tube has ignited, this no-load diagram changes into the load diagram shown in broken lines. The tube then has a running voltage $E_5$ of about 110 v., the capacitor 4 a lagging voltage $E_4$ of about 350 v. and the stray field winding 6 the voltage $E_6$, which is about three times the voltage $E_6^0$ in the no-load condition. The voltage vectors $E_6$ and $E_4$ meet each other at point D. The voltage $E_3$ of the primary winding 3 connected to the current supply 2 remains, of course, constant.

The ratio of about 3:1 between the voltages $E_6$ and $E_6^0$ implies also that the value of the magnetic induction e. g. in Gauss units, in that part of the ferromagnetic circuit which is shunted by the magnetic shunt 7, viewed from the winding 3 and which is provided with the winding 6, is in the load condition about three times the value in the no-load condition.

Figure 3:
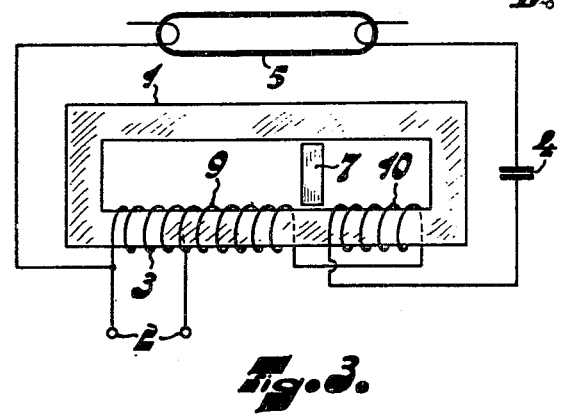
Fig. 3 is a schematic view of the same circuit shown in Fig. 1 utilizing a leakage autotransformer in accordance with the invention.

Fig. 3 shows a transformer according to the invention in which 1 designates a ferromagnetic core having a part shunted by a magnetic shunt member 7.

The unshunted part of the ferromagnetic core, at the left of the magnetic shunt 7, is provided with a winding 3, 9 and the shunted part, at the right of the magnetic shunt 7, with a winding 10. The left-hand part of the winding 3, 9, which is also designated by 3 as in Fig. 1, represents a primary winding connected to a current supply 2. The winding 9 is a secondary winding and the winding 10 is a tertiary winding. The latter is connected in this case to the secondary winding in a manner such that they counteract one another in the no-load condition. A terminal of a capacitor 4 is connected to the left-hand end of the winding 10 and the left-hand electrode of a tube 5 is connected to the left-hand end of the winding 9.

In other words, the voltage induced in the secondary winding 9 is opposed by the voltage induced in the tertiary winding 10.

Figure 4:
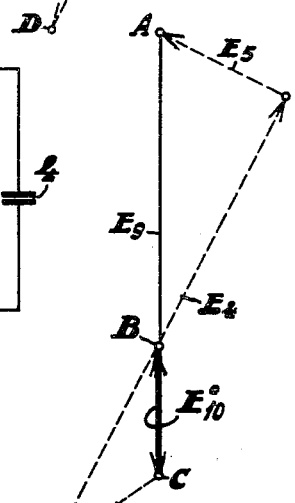
Fig. 4 is the no-load vector diagram of the circuit of Fig. 3; the dotted lines showing the vector diagram of the circuit under load condition.

From the voltage vector diagram of Fig. 4 it is evident that in the no-load condition of the transformer the voltage $E_9$ of the secondary winding, which includes the voltage across primary winding 3, which extends from A to C, is reduced by the opposite voltage $E_{10}^0$ across the tertiary winding 10, which extends from C to B, to the value A—B, which is equal to that indicated in Fig. 2 as the proper igniting voltage of the tube 5. In the load condition the voltage across the tertiary winding is $E_{10}$, which extends from C to D. The position of the point D and the direction and value of the capacitor voltage $E_4$ and of the tube voltage $E_5$ are similar to those indicated in Fig. 2.

Since point D is fixed, it will be obvious that by suitable proportioning windings 9 and 10, the voltages $E_{10}^0$ and $E_{10}$ may be readily rendered equal and that in this case the induced voltage in the shunted winding 10 remains substantially constant. In the unshunted windings the induction is, of course, substantially constant.

Figure 5:
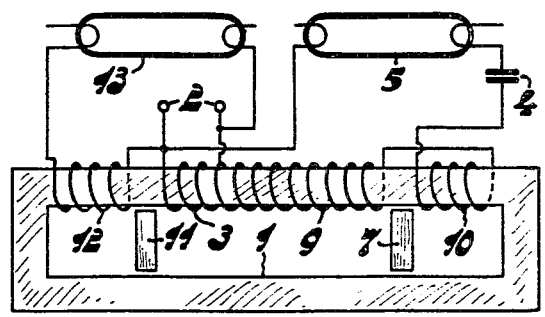
Fig. 5 is a schematic view of the circuit of a leakage autotransformer exemplifying another form of the invention for feeding a discharge tube by leading current and for feeding an additional discharge tube by lagging current.

Fig. 5 shows an auto leakage transformer exemplifying another form of the invention which is suitable for energizing a discharge tube by leading current and for energizing an additional discharge tube by lagging current. For this purpose the transformer is provided with a second magnetic shunt 11 and the ferromagnetic core 1 is extended by a prolongation, shunted by this shunt 11, on which a quaternary winding 12 is arranged, which is connected in series with the primary winding 3 and a second discharge tube 13. In this case the quaternary winding 12 is connected to the primary winding 3 in a manner such that the voltage of the current supply 2, i. e., the voltage across primary winding 3, is increased in the no-load condition to that of the igniting voltage of discharge tube 13.

Since the tube 13 is connected directly to the leakage transformer it draws a lagging current during operation, in contradistinction to tube 5, which draws a leading current due to its series connection with the capacitor 4. This results in a satisfactory power factor, which may be near unity, and a strong reduction of the stroboscopic effect of the total radiation produced by both tubes 5, 13, since the currentless periods of the tubes do not occur simultaneously.

Figure 6:
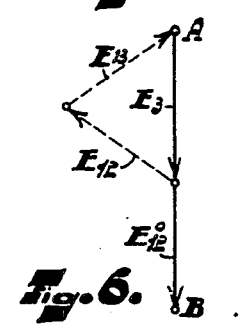
Fig. 6 is a partial vector diagram of the circuit of Fig. 5.

Part of the voltage vector diagram of the circuit of tube 13 is shown in Fig. 6. In the no-load condition the vector sum of the voltages $E_3$ and $E_{13}$ yield the no-load igniting voltage AB, and in the load condition, the sum of the voltages $E_3$ and $E_{12}$ is equal to the running voltage $E_{13}$ of the tube. It may be concluded therefrom that the induced voltage in the part of the ferromagnetic circuit shunted by the second magnetic shunt 11 is substantially independent of the load condition, so that a transformer for feeding a capacitatively stabilized tube 5 and an additional inductively stabilized tube 13 is obtained, in which a substantially constant induced voltage is available anywhere in the electromagnetic circuit, of course with the exception of the magnetic shunts 7, 11.

By way of example, in a practical case, the transformer shown in Fig. 5 for connection to a 110 v., 50 C. P. S. mains and for supplying two elongated positive column discharge tubes, each taking 25 w. at an operational current of 0.285 amp., had the following dimensions: core diameter 17 x 23 mms., the secondary winding 9 had 3130 turns and a tapping after 1030 turns for the primary coil 3; the tertiary winding 10 had 1270 turns and the quaternary winding 12 had 1260 turns.

It will be obvious that separated primary and secondary windings may be used in the transformer and that the transformer may be a core transformer or, as an alternative, a shell transformer.

While we have thus described our invention with specific examples and embodiments thereof, other modifications will be readily apparent to those skilled in the art without departing from the spirit and scope of the invention.

What I claim is:

1. A lamp system comprising a pair of gas-filled electric discharge tubes each having a given igniting potential, a leakage transformer for energizing said tubes comprising a ferromagnetic core, a first ferromagnetic member shunting a portion of said core, a second ferromagnetic member shunting another portion of said core, primary and secondary windings on the portion of said core lying between said first and second members, a tertiary winding on the portion of said core lying on the side of said first ferromagnetic member remote from said other windings, a quaternary winding on the portion of said core lying on the side of said second ferromagnetic member remote from said other windings, a source of potential which is less than said given potential, means connecting said source to said primary winding, said primary and said secondary windings having a turns ratio at which the potential induced across said secondary winding is greater than said given potential, means connecting the secondary and tertiary windings so that the potential induced across said tertiary winding opposes the potential across the secondary winding whereby the resultant potential across both windings in series is substantially equal to said given potential, means connecting the primary and quaternary windings so that the potentials induced therein are additive whereby the resultant potential across both windings in series is substantially equal to said given potential, and a capacitative reactance, one of said tubes being connected in series with said capacitative reactance and across the secondary and tertiary windings in series, the other of said tubes being connected across the primary and quaternary windings in series.

2. A lamp system comprising a pair of gas-filled electric discharge tubes each having a given igniting potential, a leakage transformer for energizing said tubes comprising a ferromagnetic core, a first ferromagnetic member shunting a portion of said core, a second ferromagnetic member shunting another portion of said core, primary and secondary windings on the portion of said core lying between said first and second members, a tertiary winding on the portion of said core lying on the side of said first ferromagnetic member remote from said other windings, a quaternary winding on the portion of said core lying on the side of said second ferromagnetic member remote from said other windings, a source of potential which is less than said given potential, means connecting said source to said primary winding, said primary and said secondary windings having a turns ration at which the potential induced across said secondary winding is greater than said given potential, means connecting the secondary and tertiary windings so that the potential induced across said tertiary winding opposes the potential across the secondary winding whereby the resultant potential across both windings in series is substantially equal to said given potential, means connecting the primary and quaternary windings so that the potentials induced therein are additive whereby the resultant potential across both windings in series is substantially equal to said given potential, and a capacitative reactance, one of said tubes being connected in series with said capacitative reactance and across the secondary and tertiary windings in series, the other of said tubes being connected across the primary and quaternary windings in series, all of the windings being so proportioned to each other that the induced voltages in each of said windings when the tube is not energized is substantially the same as when the tube is energized.

3. An electrical system comprising an electric discharge tube having an ionizable medium and a given igniting potential, a leakage transformer for energizing said tube comprising a ferromagnetic core, a ferromagnetic member shunting said core, primary and secondary windings on a portion of said core lying on one side of said shunting member and being closely coupled together, a tertiary winding on a portion of said core lying on the other side of said shunting member and being loosely coupled to said primary winding, a source of alternating potential which is less than said given potential, means connecting said source across said primary winding, said primary and said secondary windings having a turns ratio at which the potential induced across said secondary winding is greater than said given potential, means connecting the secondary and tertiary windings so that the potential induced across said tertiary winding opposes the potential across the secondary winding whereby the resultant potential across both windings in series when the tube is not energized is substantially equal to said given potential, and a capacitative reactance, said tube being connected in series with said capacitative reactance across the secondary and tertiary windings in series.

4. An electrical system as claimed in claim 3 wherein said secondary and said tertiary windings are so proportioned to each other that the potential induced across said tertiary winding when the tube is not energized is substantially equal to the potential induced across said tertiary winding when the tube is energized.

References Cited in the file of this patent

UNITED STATES PATENTS

| | | |
|---|---|---|
| 2,025,471 | Osborne | Dec. 24, 1935 |
| 2,212,198 | Sola | Aug. 20, 1940 |
| 2,496,981 | Boucher | Feb. 7, 1950 |
| 2,504,548 | Lemmers | Apr. 18, 1950 |
| 2,510,209 | Bridges | June 6, 1950 |
| 2,541,033 | Cates | Feb. 13, 1951 |